(12) United States Patent
Shropshire

(10) Patent No.: US 9,015,680 B1
(45) Date of Patent: Apr. 21, 2015

(54) DIFFERENTIAL ANALYSIS OF TRANSLATION OF SOFTWARE FOR THE DETECTION OF FLAWS

(71) Applicant: Google Inc., Mountain View, CA (US)

(72) Inventor: Benjamin Shropshire, Campbell, CA (US)

(73) Assignee: Google Inc., Mountain View, CA (US)

(*) Notice: Subject to any disclaimer, the term of this patent is extended or adjusted under 35 U.S.C. 154(b) by 118 days.

(21) Appl. No.: 13/758,477

(22) Filed: Feb. 4, 2013

Related U.S. Application Data

(60) Provisional application No. 61/602,758, filed on Feb. 24, 2012.

(51) Int. Cl.
*G06F 9/44* (2006.01)
*G06F 9/45* (2006.01)
*G06F 11/36* (2006.01)

(52) U.S. Cl.
CPC .............. *G06F 11/3696* (2013.01); *G06F 8/34* (2013.01)

(58) Field of Classification Search
CPC ... G06F 8/44; G06F 9/44589; G06F 11/3604; G06F 11/3624; G06F 11/3664
USPC .................................. 717/125–126, 140–143
See application file for complete search history.

(56) References Cited

U.S. PATENT DOCUMENTS

| | | | | |
|---|---|---|---|---|
| 5,692,047 A | * | 11/1997 | McManis | 713/167 |
| 5,754,860 A | * | 5/1998 | McKeeman et al. | 717/124 |
| 7,461,371 B2 | * | 12/2008 | Luo et al. | 717/167 |
| 8,161,469 B1 | * | 4/2012 | Iotov et al. | 717/144 |
| 8,291,497 B1 | * | 10/2012 | Griffin et al. | 726/23 |
| 2005/0193378 A1 | * | 9/2005 | Breault | 717/140 |
| 2007/0094649 A1 | * | 4/2007 | Chatterjee | 717/140 |
| 2011/0154295 A1 | * | 6/2011 | Aharoni et al. | 717/125 |

OTHER PUBLICATIONS

Baker et al., Compressing Differences of Executable Code, Apr. 22, 1999.
Yang et al., Finding and Understanding Bugs in C Compilers, copyright ACM (2011).
Flake, H., Structural Comparison of Executable Objects (undated).
Baker et al., Deducing Similarities in Java Sources from Bytecodes, Proceedings of the USENIX Annual Technical Conference (NO 98), Jun. 1998.
Flanagan et al., Detecting Race Conditions in Large Programs, PASTE '01, Jun. 18-19, 2001.

* cited by examiner

*Primary Examiner* — Ryan Coyer
(74) *Attorney, Agent, or Firm* — Lerner, David, Littenberg, Krumholz & Mentlik, LLP

(57) ABSTRACT

A method and apparatus are provided for finding errors in software by compiling a body of source code at least twice to generate a first object code file and a second object code file. The first and second object code files may be compared and disparities between them may be detected. Indications of the disparities may be output on a display screen of a computing device.

19 Claims, 7 Drawing Sheets

Fig. 2

```
                                                          ┌─ 152
int main()
{
  int i=0;
  int k= 9;
  for(i=1; i<9; i++) { k++; }
}                       └─ 202
```

```
                                                          ┌─ 210
0000000000000000 <main>:
   0:  55                          push    %rbp
   1:  48 89 e5          212       mov     %rsp,%rbp
   4:  c7 45 f8 00 00 00 00        movl    $0x0,-0x8(%rbp)
   b:  c7 45 fc 09 00 00 00        movl    $0x9,-0x4(%rbp)
  12:  c7 45 f8 01 00 00 00        movl    $0x1,-0x8(%rbp)
  19:  eb 08                       jmp     23 <main+0x23>
  1b:  83 45 fc 01       214       addl    $0x1,-0x4(%rbp)
  1f:  83 45 f8 01                 addl  216 $0x1,-0x8(%rbp)
  23:  83 7d f8 08                 cmpl    $0x8,-0x8(%rbp)
  27:  7e f2                       jle     1b <main+0x1b>
  29:  5d                          pop  218 %rbp
  2a:  c3                          retq
```

```
                                                          ┌─ 220
0000000000000000 <main>:
   0:  55                          push    %rbp
   1:  48 89 e5          222       mov     %rsp,%rbp
   4:  c7 45 f8 00 00 00 00        movl    $0x0,-0x8(%rbp)
   b:  c7 45 fc 09 00 00 00        movl    $0x9,-0x4(%rbp)
  12:  c7 45 f8 01 00 00 00        movl    $0x1,-0x8(%rbp)
  19:  eb 08                       jmp     23 <main+0x24>
  1b:  83 45 fc 01       224       addl    $0x1,-0x4(%rbp)
  1f:  83 45 f8 01                 addl  226 $0x1,-0x8(%rbp)
  24:  83 7d f8 08                 cmpl    $0x8,-0x8(%rbp)
  27:  0f 9e c0                    setle   %al
  2a:  84 c0                       test    %al,%al
  2c:  75 ed                       jne     1b <main+0x1b>
  2e:  b8 00 00 00 00              mov     $0x0,%eax
  33:  5d                          pop  228 %rbp
  34:  c3                          retq
```

DIFFERENTIAL ANALYSIS OF TRANSLATION OF SOFTWARE FOR THE DETECTION OF FLAWS

CROSS-REFERENCE TO RELATED APPLICATIONS

The present application claims the benefit of the filing date of U.S. Provisional Patent Application No. 61/602,758 filed Feb. 24, 2012, the disclosure of which is hereby incorporated herein by reference.

BACKGROUND

Testing of software is costly and time-consuming. Some software flaws manifest themselves only when a specific processor or operating system is used, while remaining dormant otherwise. Such software flaws are in part brought about by semantic factors related to the implementation of operating systems and processors that execute the software. Detecting software flaws of this variety may be especially difficult.

Executing a software application in every possible operating system or processor architecture to test for the presence of software bugs that are specific to that architecture may be cost-prohibitive. Analyzing high-level source code alone may expose logical flaws in the source code, but it may fail to account, in a cost-efficient manner, for errors that appear only when specific operating system or processor is used. In some circumstances, to account for a specific operating system or processor architecture, one may have to delve into the representation of the source code at the machine level and analyze assembly code that is compiled for that operating system or processor.

SUMMARY

In one aspect, an apparatus is provided for editing and testing source code. The apparatus comprises a memory and a processor, coupled to the memory. The memory may be configured to store a source code file. The processor may be configured to provide an editor for editing the source code file, the editor having a graphical user interface (GUI). The processor may further be configured to generate a first and second object code files. The first object file may be generated by compiling the source code file with a first compiler. The second object code file may be generated by compiling the source code file with a second compiler. Once the first and second object files are generated, the processor may compare the first object code file to the second object code file, identify a disparity between the first object code file and the second object code file, and output an indication of the disparity. The disparity may be the result from a portion of the source code file having been compiled differently by the first compiler and the second compiler. The indication of the disparity may be output via the graphical user interface (GUI) of the editor and it may identify the portion of the source code file that was compiled differently by the first compiler and the second compiler. The editor may be part of an integrated development environment or another software development tool.

The processor may further be configured to generate a first signature based on the first object code file, generate a second signature based on the second object code file, and determine a distance between the first signature and the second signature. Alternatively, the processor may further be configured to classify the disparity into one of at least a first category and a second category, wherein the identification of the portion of the source code file is output only if the disparity is not classified into the second category.

The first object code file may be generated for a first processor architecture and the second object code file may be generated for a second processor architecture different from the first processor architecture. Alternatively, the first object code file may be generated for a first operating system and the second object code file may be generated for a second operating system different from the first operating system.

In another aspect, an apparatus for editing and testing source code is provided. The apparatus comprises an output device, a memory, and a processor coupled to the memory. The memory may be configured to store a source code file. The processor may be configured to generate a first generated file and a second generated file based on the source code file. The processor may select a portion of the source code file based on a predetermined criterion that targets a specific type of instruction. Once the portion of source code file is selected, the processor may identify a first portion of the first generated file and a second portion of the second generated, wherein both the first portion and the second portion have been generated, at least in part, based on the selected portion of the source code file. The processor may then compare the first portion to the second portion, identify a disparity between the first portion and the second portion, and output, via the output device, an indication of the disparity.

The selected portion may include an atomic operation, a lock, a conditional statement, or a conversion statement. The first generated file may be produced by compiling the source code file for a first processor architecture, and the second generated file may be produced by compiling the source code file for a second processor architecture different from the first processor architecture. Alternatively, the first generated file may be produced by compiling the source code file with a first compiler, and the second generated file may be produced by compiling the source code file with a second compiler different from the first compiler.

In yet another aspect, a computer-implemented method for developing software applications is provided. The method comprises providing a software tool for detecting potential flaws, translating at least a portion of a source code file with a first translator application to generate a first translated file, and translating at least the portion of the source code file with a second translator application to generate a second translated file. The method may further include identifying a disparity between the first translated file and the second translated file, the disparity resulting from the portion of the source code file having been translated differently by the first translator application and the second translator application. The method may further include outputting, via a user interface of the software tool, an indication of a flaw in the source code file, the indication identifying the portion of the source code file that was translated differently by the first translator application and the second translator application.

The method may further include selecting the portion of the source code file based on a predetermined criterion that targets a specific type of instruction. The targeted instruction may be an atomic operation, a lock, or a conditional statement. Moreover, translating of the portion of the source code file with the first translator application may include compiling the source code file for a first operating system. Alternatively, translating of the portion of the source code file with the second translator application may include compiling the source code file for a second operating system.

BRIEF DESCRIPTION OF THE DRAWINGS

FIG. 2 depicts examples of program code that is processed using the system of FIG. 1.

DETAILED DESCRIPTION

In one aspect, a method and apparatus are provided for finding possible bugs in software. A source code file may be compiled twice to generate a first object code file and a second object code file. The first and second object code files may then be compared to each other and disparities between them may be detected. Afterwards, indications of the disparities may be output on a display screen of a computing device.

Figure 1:
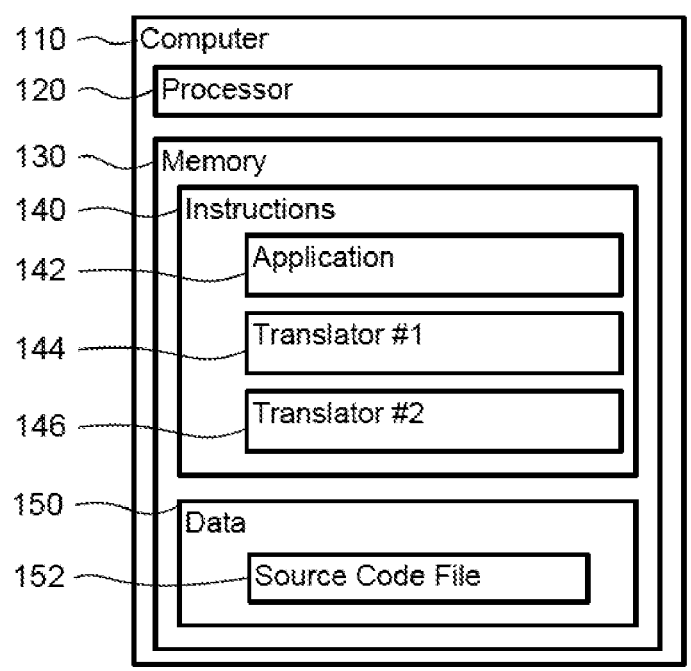
FIG. 1 depicts a schematic diagram of a system in accordance with aspects of the present disclosure.

As shown in FIG. 1, an exemplary system 100 may include computer 110. Computer 110 may contain a processor 120, memory 130 and other components typically present in general purpose computers. Computer 110 may be a personal computer, server, mainframe, laptop, desktop, cell phone, a computer cloud, a distributed system, or any other processor-based computing device.

Memory 130 of computer 110 stores information accessible by processor 120, including instructions 140 that may be executed by the processor 120. The memory also includes data 150 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as commercially available processors. Alternatively, the processor may be a dedicated controller such as an ASIC.

The instructions 140 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Application 142 may include software for comparing different translations of the same body of source code. In some aspects, the application 142 may be part of a source code editor, text editor, integrated development environment, software testing tool, a compiler, a builder, a memory-leak checker, or any other software tool that is used in the development or testing of software. The application 142 may be a standalone software tool or part of a larger software application. Translator 144 may include a compiler, linker, interpreter, source-to-source translator, or any other type of software for translating source code. In operation, the translator 144 may translate source code from a precursor programming language to a resultant programming language. The source code may be translated to assembly language or another programming language that is different from the precursor language. Like the translator 144, translator 146 may also include a compiler, linker, interpreter, source-to-source translator, or any other type of software for translating source code. The translator 146 also may translate source code from a precursor programming language to assembly language or another programming language that is different from the precursor language. In the present example, translators 144 and 146 may both be compilers.

Data 150 may be retrieved, stored or modified by processor 120 in accordance with the instructions 140. Data 150 may include a source code file 152. The source code file 152 may be a JAVA, C++, or C source code file. Alternatively, the file 152 may be an interpreted language script, such as an HTML, Mathlab or WORD script. For instance, although the system and method is not limited by any particular data structure, the data (including the source code file 152) may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

FIG. 2 depicts an example of the source code file 152. The source code file 152 may include for-loop 202 and it may be translated with translators 144 and 146 to produce files 210 and 220, respectively. The files 210 and 220 may include binary code, intermediate representations such as JAVA byte code, or instructions in any programming language that is different from the programming language of the file 152. Alternatively, the files 210 and 220 may include optimized versions of the source code in the source code file 152. Thus, in the latter example, the files 210 and 220 may also be source code files written in the same language as the file 152. In the present example, the files 210 and 220 may be object code files including assembly language instructions.

Different portions of the files 210 and 220 correspond to different parts of the file 152. The portions 212 and 222 are assembly language translations of the variable declarations found in the file 152. The portions 214 and 224 are assembly language translations of the "for loop" instruction (e.g., portion 202). When the instructions in the portions 214 and 224 are executed by a processor, they perform the for-loop specified in the portion 202.

There are several disparities between the portions 214 and 224. One of these disparities is found in sub-portions 216 and 226. Although both of the sub-portions 216 and 226 are JMP command lines, the offset specified in each of them differs. The sub-portion 216 uses 0x23 as offset, whereas the sub-portion 226 uses 0x24. In that regard, the sub-portions 216 and 226 provide an example of a disparity between the files 210 and 220 that is caused by the use of different parameters (e.g., offset indices).

Additional disparities are found in the sub-portions 218 and 228. Although both of the sub-portions 218 and 228 implement the portion of source code 202, they include different instructions. The sub-portion 218 uses the JLE assembly language instruction whereas the sub-portion 228 uses the JNE assembly language instruction. Moreover, the sub-portion 228 includes SETTLE and TEST instructions which are not present in the sub-portion 218. Thus, although the sub-portions 218 and 228 are translations of the same line of source code, they have differing structures.

Sometimes, the same source code yielding different translations may be an indication of a potential problem with the source code. For example, it may signal a hidden race condition or another software flaw. The application 142 seizes on this notion and identifies disparities in different translations of the same body of source code. The application 142 then may alert its users to those disparities, desirably drawing their attention to parts of the source code that could turn out to be problematic.

Figure 3A:
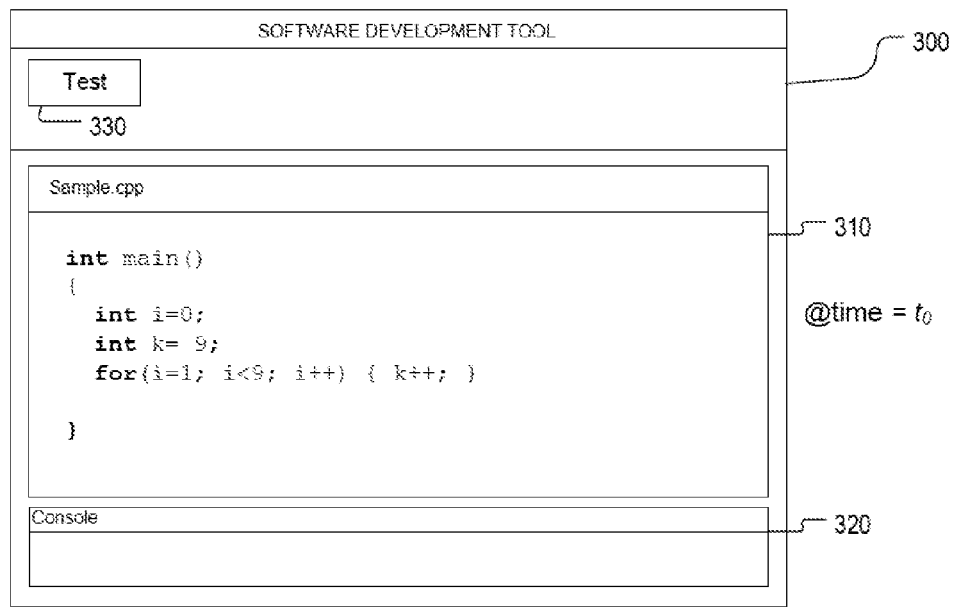
FIGS. 3A-B depict examples of the graphical user interface (GUI) of the system of FIG. 1.

FIG. 3A depicts an example of a graphical user interface (GUI) 300 of the application 142. In this example, the GUI 300 includes an editor 310 and a console 320. The editor 310 may be a text editor for editing the content of the file 152 by a user. The console 320 may by an output field for outputting messages generated by the application 142. Input component 330 may be a button, toggle switch, gesture recognizer, or any other device for receiving user input. In operation, the application 142 may compile the file 152 twice, with translators 144 and 146, to generate the files 210 and 220 when user input is received via the input component 330. The files 210 and 220 may then be processed to identify one or more disparities between them. When the existence of a disparity between them is discovered, an indication of the disparity may be output.

Figure 3B:
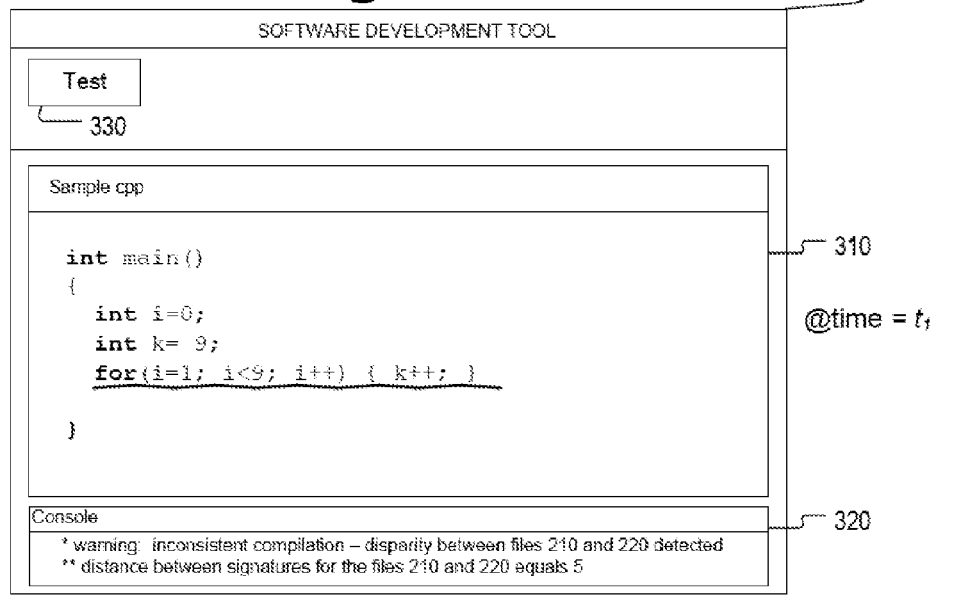

FIG. 3B depicts an example of different indications that may be output by the application 142 when the disparity between the portions 214 and 224 is discovered. In one aspect, text messages may be output in the console 320. In another aspect, the application 142 may indicate the disparity by underlining the portion 202. The portion 202 may be underlined because the portions 214 and 224 are translations of the portion 202. In that regard, the underlining may precisely identify the command line(s) in the source code file 152 that caused the disparity between the assembly language translations.

Although in the present example, the indication of the disparity between the files 210 and 220 is output visually, in other examples, it may be output audibly. Furthermore, the indication may be output as a text message, as a graphical icon, by highlighting relevant portions of source code (e.g., portion 202) or in any other manner. The present disclosure is not limited to any specific method for indicating disparities.

Figure 4:
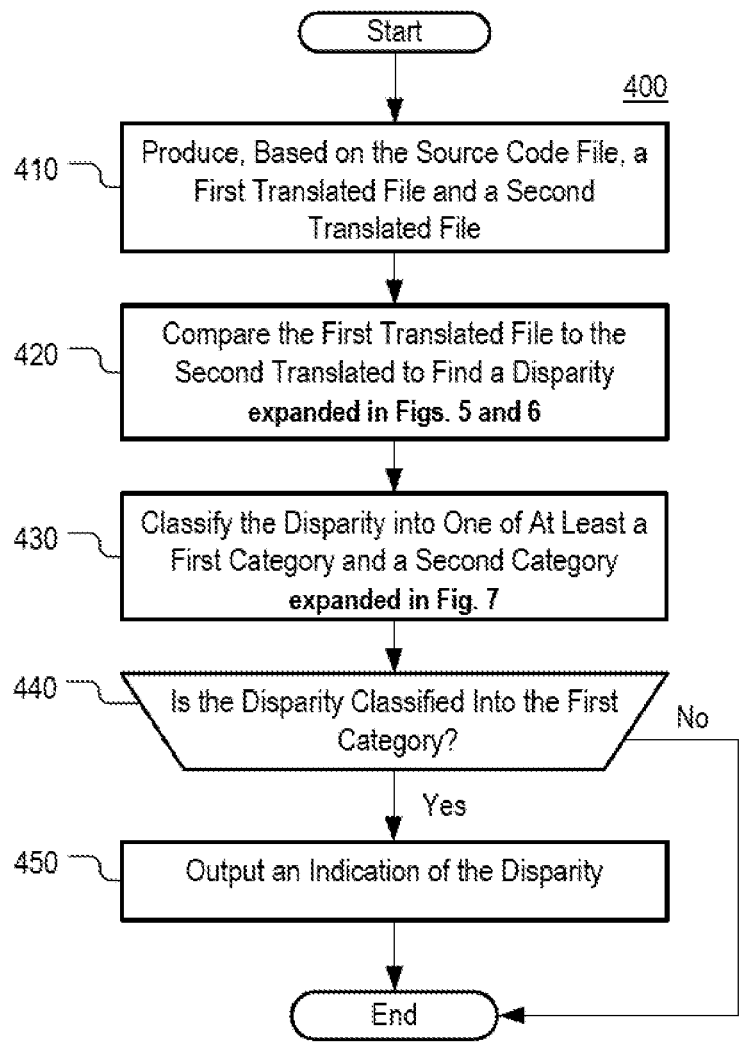
FIG. 4 depicts a flowchart of a process in accordance with aspects of the disclosure.

FIG. 4 depicts a flowchart of a process 400 performed by the application 142 in accordance with aspects of the disclosure. At task 410, the source code file 152 is compiled twice to produce the files 210 and 220. The two compilations may differ in at least one characteristic. For example, the files 210 and 220 may be compiled using different compilers, compiled using the same compiler but with different optimization settings, compiled for different operating systems, or compiled for different processor architectures.

In one aspect, the files 210 and 220 may be compiled with the same compiler. Alternatively, in another aspect, the files 210 and 220 may be produced using different compilers. Different compilers may include compilers that are developed by different companies or different teams of engineers. An example of different compilers is the G++ compiler and the MS VISUAL C++ compiler. Thus, in this example, the file 210 may be generated using the G++ compiler and the file 220 may be generated using the MS VISUAL C++ compiler. In any event, a compiler may be considered to be different from another compiler if it includes an instruction or a sequence of instructions that is not found in the other compiler.

In yet another aspect, the files 210 and 220 may be produced by compiling (or linking) the file 152 for different operating systems. For example, the file 210 may be produced by compiling (or linking) the file 152 for the ANDROID® operating system and the file 220 may be produced by compiling the file 152 for the WINDOWS® PHONE operating system. Furthermore, in yet another aspect, the files 210 and 220 may be produced by compiling the file 152 for different architectures. For example, the file 210 may be produced by compiling the file 152 for a 32-bit architecture, whereas the file 220 may be produced by compiling the file 152 for a 64-bit architecture. As another example, the file 210 may be produced by compiling the file 152 for single-core processor architecture, whereas the file 220 may be generated using compiler optimizations suitable for multi-core architectures. As yet another example, the file 210 may be produced by compiling the file 152 for the ARM architecture, whereas the file 220 may be generated by compiling the file 152 for an INTEL x86 architecture.

At task 420, the file 210 is compared to the file 220 and a disparity between the two files is identified as a result. The comparison may involve comparing a first set of instructions from the file 210 against a second set of instructions from the file 220. In one aspect, a disparity between the first set of instructions and the second set of instructions may exist when the two sets of instructions include a different number of instructions. In another aspect, a disparity between the first set of instructions and the second set of instructions may exist when the instructions in the first set are arranged in a different order than the instructions in the second set. In yet another aspect, a disparity between the first set of instructions and the second set of instructions may exist when an instruction from the first set does not match any of the instructions in the second set. In general, two instructions may be considered to match if they either include or consist of the same command (e.g., opcode) and the same parameters. The comparison of the first set of instructions to the second set of instructions is further discussed with respect to FIGS. 5-6.

At task 430, the disparity identified at task 420 is classified into one of at least a first category and a second category. The classification is performed because, generally, not all disparities between the files 210 and 220 may result from flaws in the source code of the file 152. In fact, some disparities between the files 210 and 220 may be completely benign in their nature. In that regard, when the disparity is considered likely to be a manifestation of a flaw in the file 152, it may be placed in the first category. Otherwise, the disparity may be consigned to the second category. The manner in which this classification is performed is discussed further below with respect to FIG. 7.

At task 440, it is determined whether the disparity has been classified into the first category. Upon a positive determination, task 450 is executed. At task 450, an indication of the disparity is output in the manner discussed with respect to FIG. 3B. By executing tasks 430-450, the application 142 attempts to draw user attention only to disparities classified in the first category that are considered likely to be manifestations of software bugs.

Figure 5:
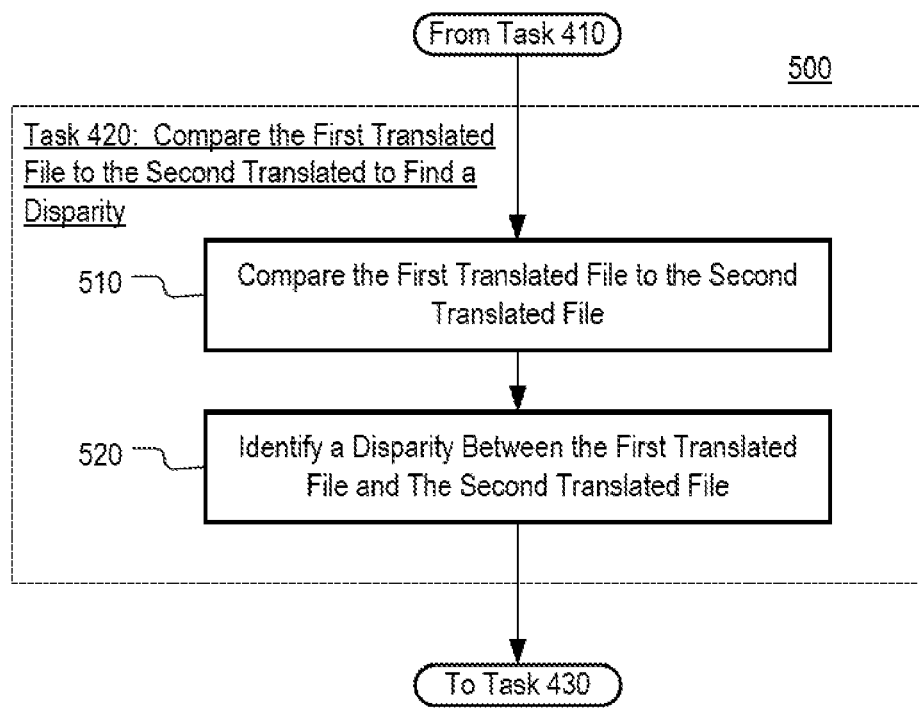
FIG. 5 depicts a flowchart of a process associated with FIG. 4.

FIG. 5 depicts a flowchart of an exemplary sub-process 500 associated with comparing the file 210 to the file 220 as specified by task 420 of FIG. 4. At task 510, a first set of instructions from the file 210 is compared to a second set of instructions from the file 220. The first set of instructions may include all or a portion of the instructions in the file 210. Similarly, the second set of instructions may also include some or all of the instructions in the file 220.

The comparison between the first set of instructions and the second set of instructions may be performed in a number of ways. In one aspect, a signature may be generated for each of the two sets. The two signatures may then be compared to each other to identify the disparity. The two signatures may be hash signatures, flowgraphs, or any other type of signature. For example, callgraphs for the two sets may be generated and compared to each other. The use of callgraphs is described in H. Flake, "Structural Comparison of Executable Objects", in Proc. DIMVA, 2004, pp. 161-173. In another aspect, text comparison tools such as Dup, Siff, and Diff may be used to find disparities between the two sets of instructions. A discussion of using such tools to analyze source code is provided in B. Baker et al., "Deducing Similarities in Java Sources from Bytecodes". USENIX Annual Technical Conference (NO 98), 1998.

In yet another aspect, the first set of instructions and the second set of instructions may be compared based on the results they produce when provided with the same set of input data. Each of the results may include one or more values. Each of the values in the result may be calculated by instructions in the set of instructions that produced the result. In instances where the files 210 and 220 are generated by compiling the file 152 for different processor architectures, the first set of instructions and the second set of instructions may be executed by using emulators for their corresponding processor architectures. Stated succinctly, the first set of instructions from the file 210 may be compared with the second set of instructions from the file 220 in a number of ways and the present disclosure is not limited to any specific method of doing so.

At task 520, a disparity between the first set of instructions and the second set of instructions is detected. In one aspect, the disparity may be detected based on output from text comparison tools indicating that an instruction from the first set (e.g., the JLE instruction in sub-portion 218) is not found in the second set (e.g., sub-portion 228) or indicating that the instructions in the two sets are ordered differently. In another aspect, the disparity may be detected based on a distance between a hash signature representing the first set and a hash signature representing the second set exceeding a threshold. In yet another aspect, a disparity between the first set and the second set may be detected based on a difference in at least one characteristic between a first graph representing the first set of instructions and a second graph representing the second set of instructions (e.g, distance between the graphs). For example, the characteristic may be based on number of edges, different number of nodes, and so forth. In any event, a hash signature or a graph is considered to represent a set of instructions if it is generated, at least in part, based on that set of instructions.

Furthermore, in yet another example, when the first and second sets of instructions are compared based on the results they produce given the same input data, a disparity between the two first set and the second set of instructions may be found to exist when the results produced by the two sets of instructions differ. Hypothetically, the first set of instructions, when executed, may produce a first result based on a set of input data and the second set of instructions, when executed, may produce a second result based on the same input data. When the first result is different from the second result, a disparity between the two sets of instructions may be found to exist.

By way of example only, the two results may be found to be different if a value that is part of the first result is not found in the second result. Alternatively, the two results may be different if a value $c_1$ that is part of the first result differs by a predetermined amount from a value $c_2$ in the second result. For example, the values $c_1$ and $c_1$ may correspond to the same source code variable from the file 152 (e.g., the variable i), or they be the result returned by the same high-level programming language function. In any event, the disclosure is not limited to any particular criterion of dissimilarity between the two results.

Figure 6:
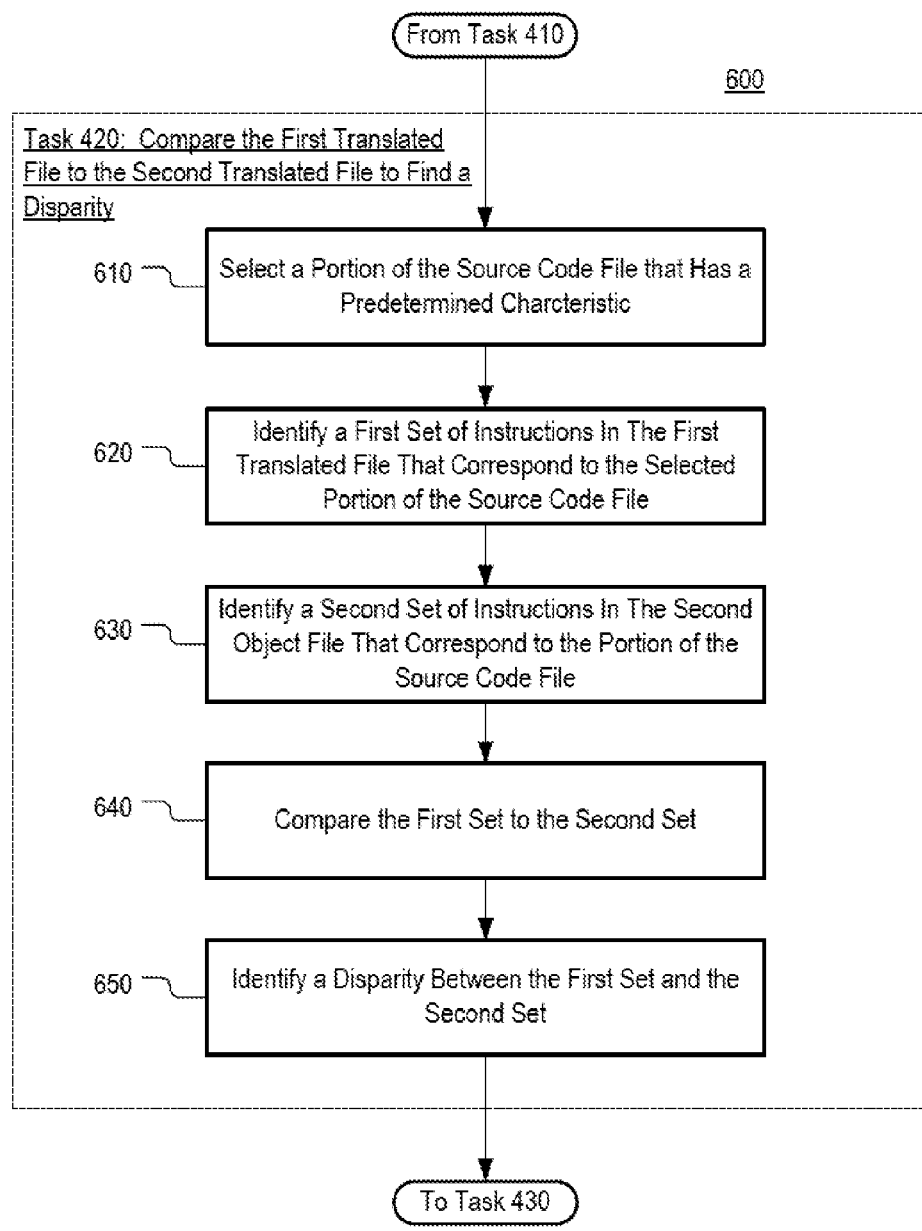
FIG. 6 depicts a flowchart of another process associated with FIG. 4.

FIG. 6 depicts a flowchart of an exemplary sub-process 600 associated with comparing the file 210 to the file 220 as specified by task 420 of FIG. 4. Unlike the sub-process 500, in the sub-process 600 specific types of source code instructions are singled out for processing.

At task 610, the file 152 is processed and a portion of the file 152 is selected. The selected portion may include a single line of code, a plurality of lines of code, or just a part of a single line of code. In the present example, the portion 202 is selected.

In some aspects, the portion may be selected from the file 152 based on a selection rule specifying a preferred type of instruction(s). Examples of such selection rules include:

S1: Select a portion of the file 152 that includes a conditional statement.
S2. Select a portion of the file 152 that includes a lock.
S3: Select a portion of the file 152 that includes a conversion statement.
S4: Select a portion of the file 152 that includes an atomic operation (or sequence of operations).

In one aspect, a portion including a conditional statement may be selected from the source code file 152, such as an if-else statement or a for-loop, among others. Conditional statements are often used to alter programs' control flow and implement various safety checks. The safety checks may involve determining whether arrays are in-bounds or determining whether exceptions have been triggered. Semantically incorrect conditional statements may compromise the control flow of programs thereby causing them to become defective. Because of their potential to cause software flaws, conditional statements may be selected from the file 152 and tested as specified by tasks 620-650.

In another aspect, a portion including a lock may be selected from the source code file 152. The lock may be a semaphore, a spinlock, a weak locking mechanism, or any other operator or function used in ensuring the atomicity of one or more instructions in the file 152. Locks and atomic operations when improperly implemented may cause data races and other software bugs. Because of their potential to cause software defects, parts of the file 152 that include locks may also be singled out and tested.

Furthermore, in yet another aspect, a transformation statement may be selected from the source code file. The transformation statement may be a typecasting statement or a statement that transforms a data structure from one type into another. Transformation statements may be complex in their nature and cause software defects under some circumstances. Accordingly, in some aspects, transformation statements may also be singled out and tested.

At task 620, a first set of instructions is selected from the file 210. The first set of instructions may be a translation (or part thereof) of the source-code instruction(s) selected at task 610. Thus, the first set of instructions may be an assembly language equivalent of at least part of the portion of source code selected at task 610. In this example, the first set may include the portion 214.

Although, in this example, the first set of instructions is a cluster of subsequent instructions from the file 210, in other aspects, the first set of instructions may include instructions that are not arranged in a subsequent order. For example, the set may consist of the instructions located at lines 0x1E, 0x22, and 0x24, thereby omitting the instructions at lines 0x1F, 0x21, and 0x23. Because compilers perform various optimizations, when a given line of source code is translated, the resulting assembly language instructions may be spread apart from one another in the object file that is produced.

At task 630, a second set of instructions is selected from the file 220. The second set of instructions may be a translation (or part thereof) of the source-code instruction(s) selected at task 610. Thus, the first set of instructions may be an assembly language equivalent of at least part of the portion of source code selected at task 610. In this example, the second set of instructions may include the portion 224. After the second set of instructions is selected, at task 640, the first set of instructions and the second set of instructions are compared to each other in the manner discussed with respect task 510. At task 650, a disparity between the first set of instructions is identified in the manner discussed with respect to task 520.

Figure 7:
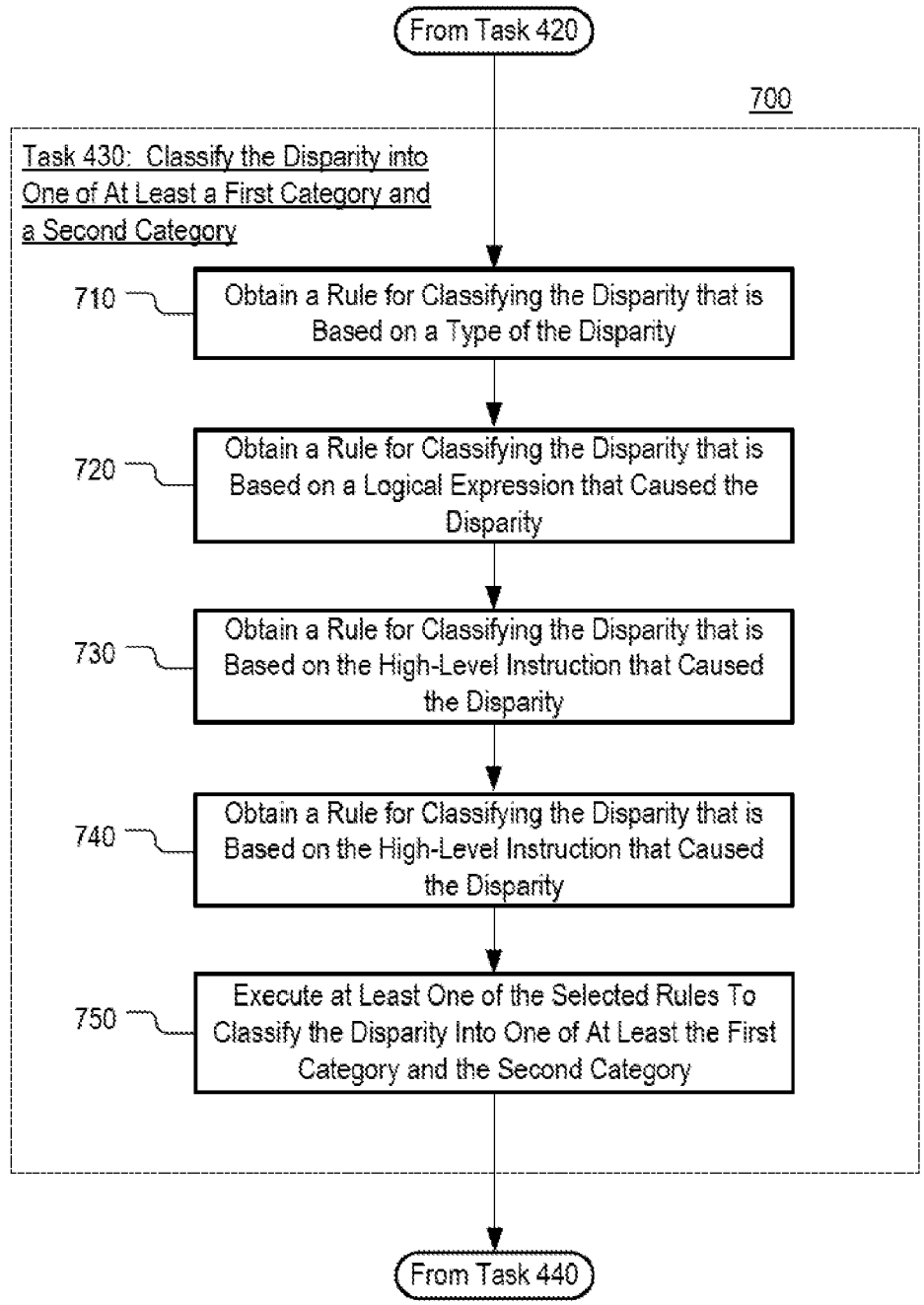
FIG. 7 depicts a flowchart of yet another process associated with FIG. 4.

FIG. 7 depicts a flowchart of an exemplary sub-process 700 associated with classifying the disparity determined at task 420 as specified by task 430 of FIG. 4. The classification may be performed in accordance with one or more classification rules. As discussed above, some disparities may be manifestations of software bugs while others may not. Classifying the disparities may separate the former from the latter.

At task 710, a classification rule is obtained that classifies the disparity identified at task 420 based on its type. Examples of such rules include:

R1: Classify a disparity between two corresponding portions of the files 210 and 220 (e.g., portion 214 and 224) into a first category, if the disparity is characterized by an operation from one portion not being found in the other one (e.g., the disparity between sub-portions 218 and 228). Each operation may be a set (e.g., a sequence) of programming language instructions (e.g., assembly language instructions) found in one of the files 210 220. Two portions of the files 210 and 220 are considered corresponding if they are translations, at least partially, of the same line of source code.

R2: Classify a disparity between two corresponding portions of the files 210 and 220 into a second category, if the disparity is characterized by the use of different offset indices (e.g., the disparity between sub-portions 216 and 226).

R3: Classify a disparity between two corresponding portions of the files 210 and 220 into a first category, if the disparity is characterized by operations in two sections of source code being arranged in a different order from one another. Each operation may be a set (e.g., a sequence) of programming language instructions (e.g., assembly language instructions) found in one of the files 210 220.

At task 720, a classification rule is obtained that classifies the disparity determined at task 420 based on a characteristic of a Boolean expression in a section of source code that is the cause of the disparity. As discussed above, the disparity between the sub-portions 216 and 226 may be viewed as resulting from the for-loop 202 being translated differently. Thus, in some aspects, the for-loop 202 may be viewed as the cause of the disparity. The Boolean expression "i<6" that is part of the loop 202, therefore, is an example of a Boolean expression that is part of a section of source code that is the cause of the disparity.

Sometimes conditional expressions may not be evaluated as expected because the Boolean expressions in them are semantically incorrect. In that regard, an attempt may be made to distinguish Boolean expressions that are at a heightened risk of being semantically incorrect by using one or more classification rules that are based on various Boolean expression characteristics. Examples of such rules include:

R4: Classify the disparity into a first category, if the number of operands in the Boolean expression exceeds a threshold.

At task 730, a classification rule is obtained that classifies the disparity determined at task 420 based on type of the source code instruction (or set of instructions) that is the cause of the disparity. In this example, as noted, the portion 202 in the file 152 is the cause of the disparity between the portions 214 and 224 of the files 210 and 220, respectively. Examples of such rules include:

R6: Classify the disparity into a first category, if the programming language instruction that is the cause of the disparity is a conversion statement.

R7: Classify the disparity into a second category, if the programming language instruction that is the cause of the disparity is a conditional statement.

At task 740, a classification rule is obtained that classifies the disparity determined at task 420 based on one or more characteristics of signatures that represent the files 210 and 220 or portions thereof. Examples of such classification rules include:

R8: Classify the disparity into a first category if the distance between a hash signature that represents the file 210 (or portion 214) and a hash signature that represents the file 220 (or portion 224) exceeds a threshold.

R9: Classify the disparity into a first category if the difference in the number of nodes in a graph that represents the file 210 and a graph that represents the file 220 exceeds a threshold.

At task 750, one of the rules selected at tasks 710-740 is executed and the disparity determined at task 420 is classified accordingly. Furthermore, in one aspect, the application 142 may present to the user information used in classifying the disparity. For example, the application 142 may output, via the console 320, an indication of a distance between signatures for the two portions of source code, output an indication of the type of high-level programming language instruction that is the cause of the disparity, or output an indication of any other characteristic used in classifying the disparity.

It should be noted that, FIGS. 4-7 are provided as an example. In some aspects, at least some of the tasks may be performed in a different order, performed concurrently, or altogether omitted. Moreover, although the examples above deal with the comparison of the files 210 and 220 to one another to find disparities, in other examples an optimized version of the file 152 may be generated using a source code optimizer and compared to the source code file 152 directly in order to find disparities between the two. Furthermore, although in the present example, at task 430, disparities between the first set of instructions and the second set of instructions are classified into one of the categories in other examples, the disparities may be assigned a score (e.g., from 0 to 100) indicating the probability of them being the result of a flaw of the source code in the file 152.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate some of many possible aspects.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The invention claimed is:

1. An apparatus for editing and testing source code, the apparatus comprising,
    a memory for storing a source code file;
    a processor, coupled to the memory, the processor being configured to:
    provide an editor for editing the source code file, the editor having a graphical user interface (GUI);
    compile the source code file using a first compiler to generate a first object code file;
    compile the source code file using a second compiler to generate a second object code file, the second compiler being different from the first compiler;
    compare the first object code file to the second object code file;
    identify a particular portion of at least one of the first object code file and the second object code file which includes a disparity, the disparity resulting from a portion of the source code file having been compiled differently by the first compiler and the second compiler;
    classify the disparity into one of at least a first category and a second category based on at least one of a type of the disparity, a characteristic of an expression in the particular portion, a type of source code instruction that caused the disparity, and one or more characteristics of signatures that represent at least a portion of the first object code file and the second object code file; and
    output, via the graphical user interface (GUI) of the editor, an identification of the portion of the source code file that was compiled differently by the first compiler and the second compiler based on the category.

2. The apparatus of claim 1, wherein the editor is part of an integrated development environment.

3. The apparatus of claim 1, wherein the editor is part of a software development tool.

4. The apparatus of claim 1, wherein the processor is further configured to:
    generate a first signature based on the first object code file;
    generate a second signature based on the second object code file; and
    determine a distance between the first signature and the second signature.

5. The apparatus of claim 1,
    wherein the identification of the portion of the source code file is output only if the disparity is not classified into the second category.

6. The apparatus of claim 1, wherein the first object code file is generated for a first processor architecture and the second object code file is generated for a second processor architecture different from the first processor architecture.

7. The apparatus of claim 1, wherein the first object code file is generated for a first operating system and the second object code file is generated for a second operating system different from the first operating system.

8. An apparatus for editing and testing source code, the apparatus comprising,
    an output device;
    a memory for storing a source code file;
    a processor, coupled to the memory, the processor being configured to:
    generate, with a first compiler, a first generated file based on the source code file;
    generate, with a second compiler, a second generated file based on the source code file;
    select a portion of the source code file based on a predetermined criterion that targets a specific type of instruction;
    identify a first portion of the first generated file that has been generated, at least in part, based on the selected portion of the source code file;
    identify a second portion of the second generated file that has been generated, at least in part, based on the selected portion of the source code file;
    compare the first portion of the first generated file to the second portion of the second generated file;
    identify a disparity between the first portion of the first generated file and the second portion of the second generated file;
    classify the disparity into one of at least a first category and a second category based on at least one of a type of the disparity, a characteristic of an expression in the selected portion of the source code file, a type of source code instruction that caused the disparity, and one or more characteristics of signatures that represent at least a portion of the first generated file and the second generated file; and
    output, via the output device, an indication of the disparity based on the category.

9. The apparatus of claim 8, wherein:
    the first generated file is produced by compiling the source code file for a first processor architecture; and
    the second generated file is produced by compiling the source code file for a second processor architecture different from the first processor architecture.

10. The apparatus of claim 8, wherein the selected portion includes an atomic operation.

11. The apparatus of claim 8, wherein the selected portion of the source code includes a lock.

12. The apparatus of claim 8, wherein the selected portion may include a conditional statement.

13. The apparatus of claim 8, wherein the selected portion includes a conversion statement.

14. A computer-implemented method for developing software applications, the method comprising:
    providing a software tool for finding software flaws;
    translating at least a portion of the source code file with a first translator application to generate a first executable code;
    translating at least the portion of the source code file with a second translator application to generate a second executable code;
    identifying a particular portion of at least one of the first executable code and the second executable code which includes a disparity, the disparity resulting from the portion of the source code file having been translated differently by the first translator application and the second translator application;
    classifying the disparity into one of at least a first category and a second category based on at least one of a type of the disparity, a characteristic of an expression in the particular portion, a type of source code instruction that caused the disparity, and one or more characteristics of signatures that represent at least a portion of the first translated file and the second translated file; and outputting, via a user interface of the software tool, an indication of a flaw in the source code file, the indication identifying the portion of the source code file that was translated differently by the first translator application and the second translator application.

15. The computer-implemented method of claim 14, further comprising selecting the portion of the source code file based on a predetermined criterion that targets a specific type of instruction.

16. The computer-implemented method of claim 15, wherein the portion of the source code file includes an atomic operation.

17. The computer-implemented method of claim 15, wherein the portion includes a lock.

18. The computer-implemented method of claim 15, wherein the portion of the source code file includes a conditional statement.

19. The computer-implemented method of claim 14, wherein:

the translating of the portion of the source code file with the first translator application includes compiling the source code file for a first operating system; and the translating of the portion of the source code file with the second translator application includes compiling the source code file for a second operating system.

\* \* \* \* \*